United States Patent [19]

Memmen

[11] Patent Number: 4,512,159

[45] Date of Patent: Apr. 23, 1985

[54] CLIP ATTACHMENT

[75] Inventor: Robert L. Memmen, Juno Isles, Fla.

[73] Assignee: United Technologies Corporation, Hartford, Conn.

[21] Appl. No.: 595,859

[22] Filed: Apr. 2, 1984

[51] Int. Cl.³ .............................................. F23R 3/20
[52] U.S. Cl. ..................................... 60/752; 60/39.31; 60/39.32
[58] Field of Search .................... 60/39.31, 39.32, 722, 60/752, 753, 755, 756, 757, 758, 759, 760; 267/164; 24/543, 563, 658, 295, DIG. 9, DIG. 28; 301/113; 295/50; 403/DIG. 7, DIG. 10

[56] References Cited

U.S. PATENT DOCUMENTS

| Re. 14,595 | 2/1919 | Bulley | 24/658 |
| 1,055,440 | 3/1913 | Boden | 24/658 |
| 1,067,125 | 7/1913 | Maney | 24/563 |
| 1,187,994 | 6/1916 | Ilse | 24/658 |
| 1,621,008 | 3/1927 | Fricker | 24/563 |
| 1,857,488 | 5/1932 | Weeks | 24/563 |
| 2,651,912 | 9/1953 | Abbott | 60/755 |
| 4,302,941 | 12/1981 | Du Bell | 60/757 |
| 4,471,623 | 9/1984 | Griffin | 60/39.31 |

FOREIGN PATENT DOCUMENTS

| 136220 | 12/1902 | Fed. Rep. of Germany | 301/113 |
| 92962 | 2/1922 | Switzerland | 24/658 |
| 1487064 | 9/1977 | United Kingdom | 60/39.32 |

Primary Examiner—Louis J. Casaregola
Assistant Examiner—Timothy S. Thorpe
Attorney, Agent, or Firm—Norman Friedland

[57] ABSTRACT

The segmented wall of the float-wall combustor liner for a gas turbine engine is retained by a clip secured to a post extending radially from the outer wall through an opening in the segmented wall. The clip serves to load the walls radially and has fail-safe features preventing inadvertent dislodging.

2 Claims, 5 Drawing Figures

CLIP ATTACHMENT

DESCRIPTION

1. Technical Field

This invention relates to clip attachments and particularly to clip retention mechanism for securing the float-wall panels to the outer shell of the combustor liner for a gas turbine type power plant.

2. Background Art

This invention constitutes an improvement over U.S. Pat. No. 4,302,941 granted to T. L. DuBell on Dec. 1, 1981 entitled "Combustion Liner Construction for Gas Turbine Engine" and assigned to United Technologies Corporation, the same assignee as this patent application. Suffice it to say that the floatwall combustor wall consists of an outer shell which may be formed in a complete hoop or segmented and has attached thereto a plurality of free floating segments that are adapted to be displaced axially and circumferentially in response to the thermals of the system. Such designs are capable of withstanding the hostile environment which they are subjected with an improved durability characteristic.

The problem inherent in the float-wall Combustor design is the attachment of the floating wall segments to the outer shell. One such scheme used heretofore is forming a hook integral with the segmented float-wall panel that passes through an aperture in the outer shell to which is attached a strap and such a system is relatively complex and expensive.

This invention comtemplates attaching the floatwall panels by a spring clip adapted to fit onto an integral post so as to preload the panel in a radial direction. Because this is virtually the only load on the spring clip notwithstanding the high temperature environment, such a retention system is highly durable, improving the maintainability of the combustor liner. Since the clips are removable without damage to the post. the removal of panels is facilitated which enhances the maintainability of the combustor.

Another aspect of this invention is a novel clip design adapted to secure a removable assembly with the clip which is clipped onto a cooperating post. The clip is characterized by being self-retaining with protection against inadvertent dislodging and capable of imparting a radial load to the assembled parts.

Disclosure of Invention

An object of this invention is to provide for the combustor of a turbine type power plant and improved retention means for float-wall segmented panels. A feature of this invention is that a spring clip fits an integral post formed on the float-wall panel and spring loads the panel to the outer shell while allowing axial and circumferential movement relative to each other. Another feature of this invention is that the spring clip is designed to prevent itself from becoming dislodged as is the case of heretofore known spring clips. Another feature of this invention is the design of the slot in the post to prevent rotation of the clip and facilitate the insertion of the clip.

Another feature is an improved spring clip retention which is characterized as being relatively inexpensive and retains the installed parts in a positive manner.

DRIEF DESCRIPTION OF THE DRAWINGS

BEST MODE FOR CARRYING OUT THE INVENTION

While this invention in its preferred embodiment constitutes an improvement on the float-wall segmented panels as described in U.S. Pat. No. 4,302,941, supra, and utilized for aircraft engines manufactured by Government Products Division of United Technologies Corporation it is to be understood that this retention system may be employed in other types of combustor liner configurations or components of the engine. For example, such an improvement may be utilized in the transition duct leading the combustion products from the can burners to the turbine inlet.

Figure 1:
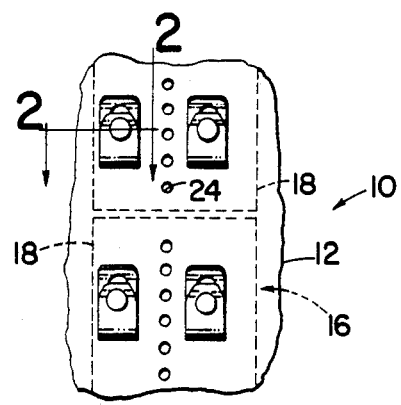
FIG. 1 is a partial plan view of the shell and float-wall panel with the improved retention means.
Figure 2:
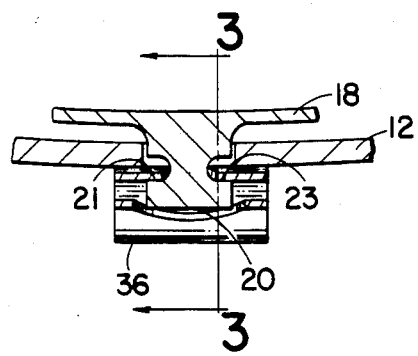
FIG. 2 is a sectional view taken along section lines 2—2 of FIG. 1 showing the post protruding through an aperture formed in the shell.
Figure 3:
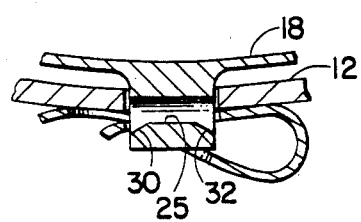
FIG. 3 is a sectional view taken along lines 3—3 of FIG. 2.

As noted from FIGS. 1-4 the combustor 10 (only partially shown) comprises outer shell generally indicated by reference numeral 12 and an inner liner generally indicated by reference numeral 16. The inner liner 16 defining the flow path of the engine's working medium consists of a plurality of segments 18 spaced around the circumference of the shell and extending axially along the flow path. Each segment 18 carries at least one integral post 20 that is adapted to extend radially through apertures 22 formed in shell 12. As noted, posts 20 are slotted at diametrically opposed sides 21 and 23, in a direction specifically related to the cooling air holes 24. In this instance these slots are generally parallel to the row of cooling air holes 24. The important consideration is that the slots are designed so that when the clip is assembled it does not rotate and obstruct these cooling air holes 24. Each side of the lower shoulder 25 adjacent the slots 21 and 23 is beveled at 30 and 32 as shown in FIG. 2. This ramp serves to facilitate the assembly of the clip.

Figure 4:
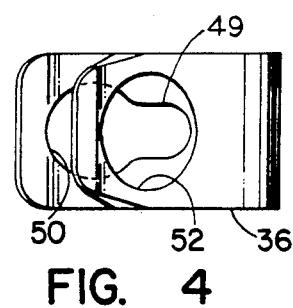
FIG. 4 is a plan view of the clip.
Figure 5:
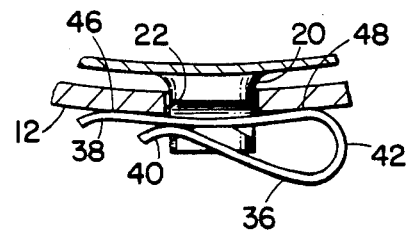
FIG. 5 is an enlarged view showing the clip in the installed position.

The clip 36 is best shown in FIGS. 4 and 5 as comprising a relatively U-shaped unitary unit stamped out of a relatively thin flat stock of highly resilient and flexible material. Obviously, the metal selected must be capable of withstanding the hostile environment and must be sufficiently flexible and resilient to impart a spring load to the panels 28 and shell 12 as will be described hereinbelow.

Each leg 38 and 40 of the U-shaped clip extend from the radius 42 relatively parallel but bent toward each other so as to meet at a point of contact.

The inner leg 38 (the leg adjacent shell 23) is sinusoidally shaped so that the high points 46 and 48 contact the face of shell 12 at points straddling the aperture 22.

The holes in each of the legs 38 and 40 are specifically designed to assure (1) proper orientation of the clip, (2) prevention of falling off the post once installed and (3) restrain to rotate. As noted from FIG. 4, the inner leg 38 is longer than the outer leg 40 and the hole 50 is axially spaced from hole 52. The diameter of each hole 50 and 52 is dimensioned slightly larger than the diameter of post 18. The inner leg 38 is further slotted from the edge of hole 50 to form opening 49 and extending to underlie the hole 52 and is dimensioned to fit the reduced size of post 20 between the diametric slots 21 and 23. This serves to orient the clip and prevents rotation thereof. Additionally the inner face of leg 38 bears against the shoulder 25 urging the panel 18 toward shell 12. This radially loads the shell and panel toward each other, while allowing circumferential and axial movement relatively to each other, so as to minimize chattering and hence preventing any acoustical problems that might otherwise occur and minimizing cycle fatigue problems.

As is apparent from the foregoing and inasmuch as the clip completely encircles the post 20 the clip is unable to slip off and hence cannot become dislodged, which would otherwise be untolerated, to avoid the possibility of it being injested in the engine's turbine. The retaining force of the outer leg 40 of clip 36 can be adjusted simply by removing material in the radius portion 42 as for example locating a hole in the arc segment of radius 42.

While in certain installations it may be possible to assemble the clip by hand, in others it may be necessary to use a mounting tool. Such a tool could be a suitable pliers modified to hold the clip where one member bears against the radius end of the clip and the other member bears against the post forcing the clip to ride up the ramp 32 fitting the slotted section 49 when the handle of the pliers are squeezed together.

I claim:

1. In combination, a combustor for a gas turbine engine having an outer shell and an inner segmented free floating member conforming to the shape of the outer shell defining a combustion section, the segmented members movable circumferentially and axially in response to the combustion products relative to the outer shell, means for securing said segmented members to said outer shell including at least one post integral with each of said segmented members extending radially through an opening in said shell, a clip being generally U-shaped but having at least one leg bent inwardly toward the other leg to bear against the surface thereof, a hole remote from the end of one of said legs sized to fit said post, a first slot smaller in width of said hole extending from said hole to fit a second slot formed in said post spaced from the end thereof, a hole in the other leg overlying said first slot to receive said post so that it extends radially beyond said clip in the secured position, whereby said clip retains said segmented member to said shell and is oriented in a given position and incapable of becoming dislodged by axial movement.

2. In combination as in claim 1 wherein the leg adjacent said shell is sinusoidally shaped to bear against the surface of said shell at predetermined points to impart a radial load thereto.

* * * * *